UNITED STATES PATENT OFFICE.

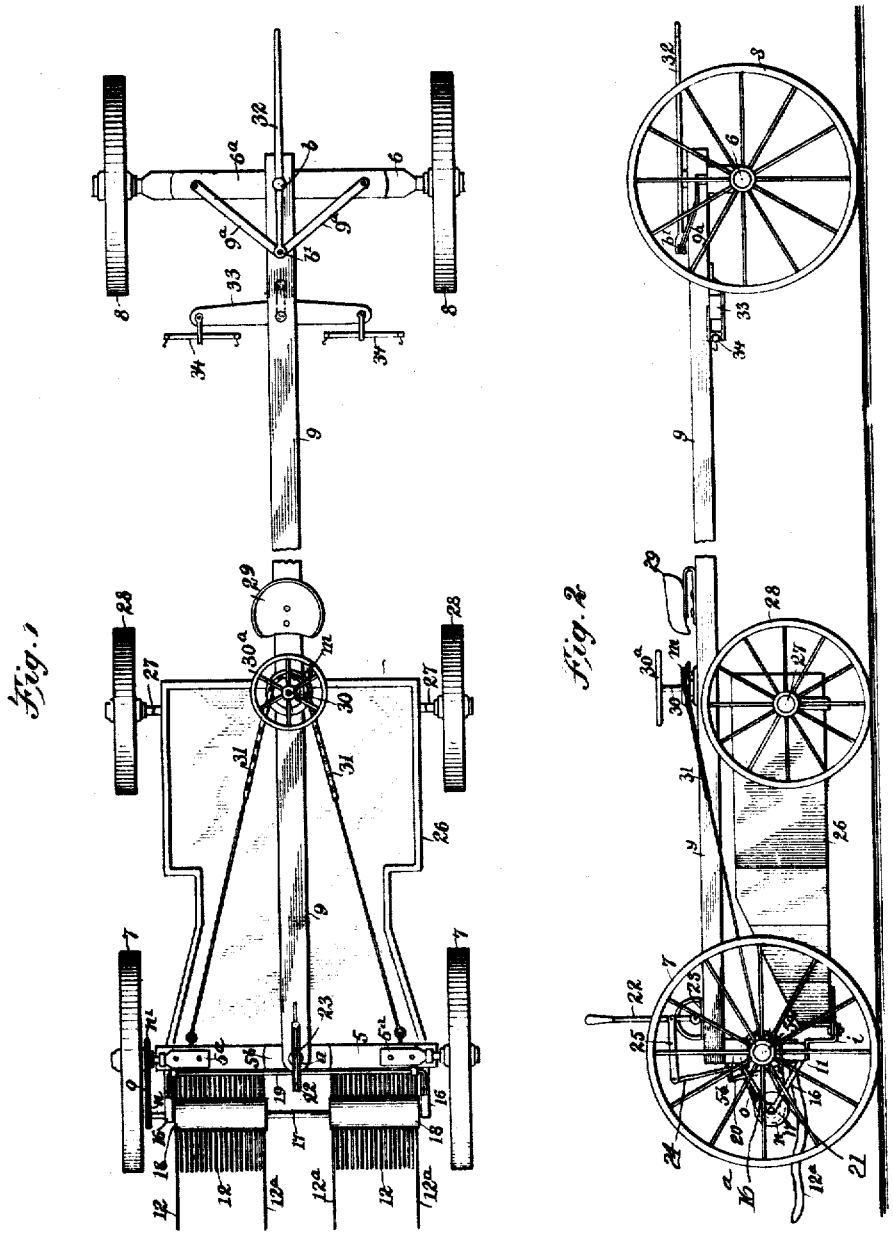

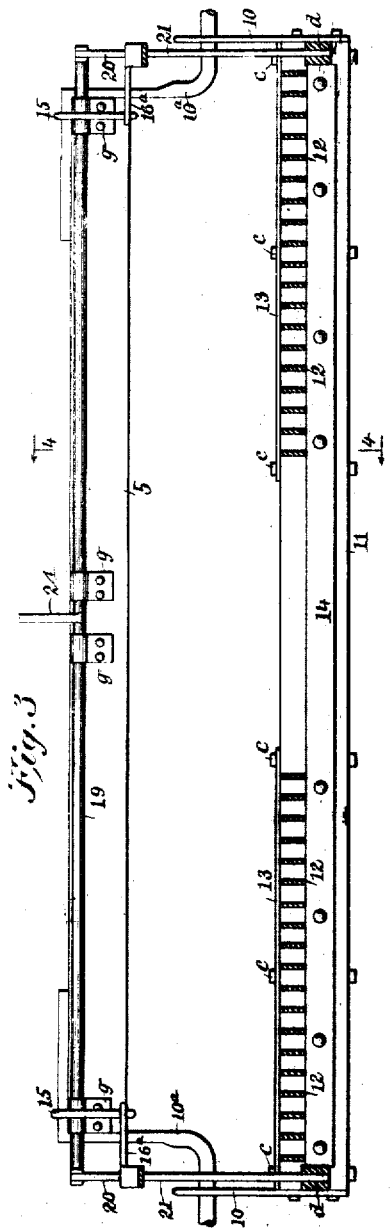
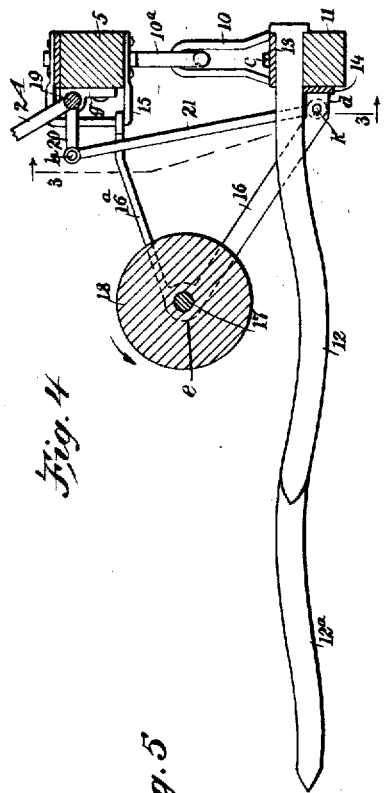
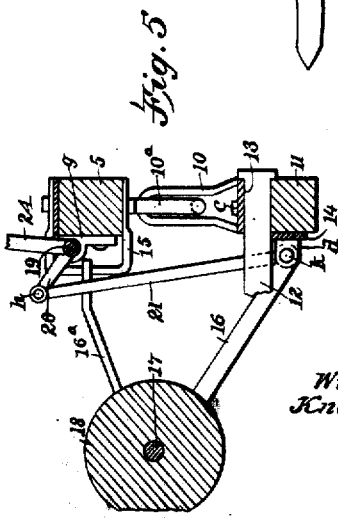

WILLIAM WARREN EDGE AND KNOTLEY FONZO CAMPBELL, OF JUD, TEXAS.

MACHINE FOR GATHERING COTTON.

954,382.  Specification of Letters Patent. Patented Apr. 5, 1910.

Application filed May 19, 1909. Serial No. 497,049.

*To all whom it may concern:*

Be it known that we, WILLIAM WARREN EDGE and KNOTLEY FONZO CAMPBELL, both citizens of the United States, and residents of Jud, in the county of Haskell and State of Texas, have invented a new and Improved Machine for Gathering Cotton, of which the following is a full, clear, and exact description.

The purpose of our invention is to provide novel features of construction for a cotton gathering machine, which enable the removal of cotton burs containing ripe cotton from the plants, directly into a receptacle as the machine is moved along rows of cotton plants in a field where they have grown.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a plan view of the complete machine; Fig. 2 is a side view of the same; Fig. 3 is an enlarged partly sectional front view of novel details, taken substantially on the line 3—3 in Fig. 4; Fig. 4 is a longitudinal sectional view, substantially on the line 4—4 in Fig. 3; and Fig. 5 is a fragmentary sectional view, showing the parts represented in Fig. 4, somewhat changed in adjustment.

In the drawings, means for supporting and progressively moving the operative details of the cotton gatherer are shown, consisting essentially of a wheeled wagon that embodies two axles, wheels thereon, bolsters and an elongated reach bar that connects the axles.

As shown, 5 indicates a preferably wooden front axle having stub spindles 5ᵃ secured thereon; 6 a substantially similar rear axle; 7, 8, similar traction wheels that in pairs are rotatably mounted upon the front and rear axles; 5ᵇ and 6ᵃ bolster blocks that are secured upon the upper sides of the axles respectively; and 9 a reach pole or bar of considerable length. The reach bar 9 is pivoted at its front end on the bolster block 5ᵇ, as appears at *a* in Fig. 1, and the rear end thereof is pivoted to the bolster block 6ᵃ by the king bolt *b*.

From the ends of the front axle 5, two similar arms are downwardly extended and upon the lower ends of said arms, the ends of a head bar 11 are secured, thus supporting the latter below and parallel with the front axle 5, the arms being each formed of two engaged links 10, 10ᵃ. Two series of evenly-spaced tines 12 are mounted upon the head bar 11, these two equal groups of tines being equally spaced from the center of the head bar as shown in Figs. 1 and 3. The tines 12 are mainly of an equal length and all are pointed at their free ends, they being formed of flat bars of suitable metal, preferably undulated edgewise, as shown in Figs. 2 and 4. The outside tines 12ᵃ of each series are somewhat longer than those between them. The tines are all arranged in the same horizontal plane, and are preferably secured in spaced transverse slots formed in the upper edge of the head bar 11. Each series of tines 12 is secured rigidly in place on the head bar by means of a strap iron bar 13 that is secured over the rear ends of the tines by bolts *c* that clamp the bars 13 upon the head bar 11, as shown in the drawings. Below the tines 12, on the front side of the head bar 11, a keeper bar 14 is secured, which bears upon the lower edges of the tines and aids in their rigid support.

Referring to the arms that serve as hangers for the head bar 11, it will be noted that the link member 10 for each hanger arm projects up from the head bar, while the complementary link member 10ᵃ depends from the lower side of the front axle, and these link members have a loose engagement with each other.

Upon the front side of the axle 5, two guide brackets 15 are secured, these similar brackets each having rectangular loop shape, and as shown in Figs. 4 and 5, the vertical member of each guide bracket is spaced from and disposed parallel with the axle 5.

Two carrier frames are provided, each one having two members 16, 16ᵃ, that diverge from a journal box *e* that is formed at their junction with each other, one member 16 of each carrier frame being secured upon the front side of the keeper bar 14 near its end, and the other member 16ᵃ that inclines upward toward the axle 5, having a loose connection with a respective guide bracket 15, as shown in Figs. 4 and 5.

Upon a transverse shaft 17, that is journaled at its ends in the boxes *e*, two similar rollers 18 are secured, that are respectively located above and near to a series of the tines 12, and as shown in Fig. 1, the length of the rollers adapts them to lie above all the tines in a series.

On the front side of the axle 5, a rock shaft 19 is rockably supported by boxes $g$, and at each end thereof a short rock arm 20 projects forwardly. Upon the outer end of each rock arm 20, the upper end of a connecting rod 21 is pivoted as shown at $h$ in Figs. 4 and 5, said rods having an equal length. The lower ends of the connecting rods 21 respectively lap upon the lower portions of the members 16 of a corresponding carrier frame and are thereon pivoted, as shown at $k$ in Figs. 4 and 5. Upon one extended end of the roller-supporting shaft 17, a small sprocket gear $n$ is mounted, and opposite said gear a larger sprocket gear $n'$ is secured on the hub of an adjacent traction wheel 7, said gears being connected by an endless chain $o$, whereby the progressive movement of the machine will effect a rotation of the rollers 18 in a direction toward the head bar 11, as shown in Figs. 1, 2, and 4.

An upright lever 22 is pivoted on a stand 23 that is seated upon the reach bar 9 near its forward end, said stand supporting a sector of well-known form that controls the rocking movement of the lever 22. From the center of the shaft 19, an arm 24 projects upwardly and to the end of the said arm is pivoted one end of a link 25, whose other end is pivoted to the lever 22. It will be seen that upon rocking the lever 22 rearwardly, the head bar 11 and tines 12 will be raised from their normal position and the rollers 18 also.

A wheeled receptacle 26 is a detail of the invention, and as shown, consists of a rectangular body portion mounted upon an axle 27 that is secured transversely on the body near its rear end, and on said axle two wheels 28 are rotatably mounted. The forward end of the receptacle 26 is open, and as shown, is connected with the head bar 11 by a bracket arm $i$ or the like. The height of the wheels 28 and width of the body 26, is such that the body may be positioned below the reach bar 9, and have ample clearance laterally from the front wheels 7, so that the open front end of the body will be positioned near the head bar.

On the reach bar 9, at a suitable point, a seat 29 is mounted, preferably near the rear end of the body 26 of the wheeled receptacle, so that the occupant may rest his feet on the rear end wall of said body. In front of and near the seat 29, a shaft 30 is rotatably supported on the reach bar 9, and on said shaft a sprocket gear $m$ is mounted and secured near the reach bar. On the sprocket gear $m$, a chain 31 has engagement near its center, and thence its equal portions are extended toward the respective ends of the front axle 5, with which they are connected by links. On the upper end of the vertical shaft 30, a hand wheel 30ª is mounted and affixed, and it will be seen that one occupying the seat 29 may by manipulation of the hand wheel, control the direction of progressive movement given to the forward end of the machine.

To the bolster block 6ª, on opposite sides of the reach bar 9, links 9ª are pivoted and the forward ends of the said links are pivoted to the lever 32, fulcrumed on the king bolt $b$. It will be seen that the lateral rocking movement of the lever 32 will swing the rear axle 6, as the links, by their pivotal connection with the bolster block 6ª and the lever 32, transmit the rocking movement of said lever to the rear axle. Upon the reach bar 9, forward of the braces or link plates 9ª, a doubletree 33 is pivoted that is provided with two swingletrees 34, thus affording means for connecting a pair of draft animals with the reach bar at each side thereof. It will be noted that the driver of the team also manually controls the travel of the rear wheels 8, so as to conform with the direction of movement given to the front wheels 7, this obviously being effected by the manipulation of the lever 32.

In operating the machine, the entire apparatus is moved along over two adjacent rows of cotton plants, and the tines 12ª that are disposed at the sides of the series of tines 12 guide the lateral branches of the plants into the path of the tines 12. The cotton held in the burs growing on the stalks, will remain in said burs, which will be stripped from the stalks by the tines 12 and slide rearward on their upper sides beneath the rollers 18, which latter will aid in the removal of the burs. If the plants vary in height, the tines may be varied somewhat to catch the upper limbs of the stalks, this elevation of the tines and rollers being effected by a proper adjustment of the lever 22. It will be understood that the cotton burs will be crowded rearward as they are removed from the stalks, and pass into the wheeled receptacle 26 from which they may be removed when this is desired. As before explained, the machine may be guided by manipulation of the hand wheel 30ª and rear lever 32. The team of draft animals are positioned rearward of the receptacle 26 to prevent injury being done to the plants that have not been operated upon by the machine.

Having thus described our invention, we claim as new and desire to secure by Letters Patent:

1. A cotton gatherer, embodying a progressively-movable vehicle, a head bar vertically adjustable on the front portion of the vehicle, two series of spaced tines projected forwardly from the head bar, a transverse shaft rotatably supported above and near to the tines, two rollers carried by the shaft, and respectively disposed above the two series of tines, and means for rotating the shaft and rollers.

2. A cotton gatherer, embodying an elongated reach-bar, a rear axle, a front axle, said axles being pivoted respectively upon the rear and front portions of the reach bar, traction wheels on the axles, a head bar hung from the front axle, two series of spaced tines forwardly extended from the head bar means for swinging the head bar, a transverse shaft rotatably supported above the tines, two spaced rollers on the shaft, and sprocket gearing connecting the shaft with the hub of a forward traction wheel.

3. In a cotton gatherer, the combination with a progressively-movable vehicle, comprising an elongated reach bar, a front axle, a rear axle, and traction wheels on the axles, a head bar carried by the front axle spaced tines extended forwardly from the head bar, rollers rotatable above the tines, and a wheeled receptacle arranged below the reach bar and between the front and rear axles and having its front end connected with the head bar, said receptacle being adapted for directly receiving cotton gathered by the tines and pressed rearward by the rollers.

4. In a cotton gatherer of the character described, the progressively-movable vehicle, comprising an elongated reach bar, a rear axle, two link plates pivotally mounted upon the rear axle, a front axle pivoted on the front portion of the reach bar, traction wheels on the axles, a head bar hung from the front axle, spaced tines projected forwardly from the head bar, means for manually controlling the turning movement of the front axle, and a lever pivotally mounted upon the rear axle and pivoted to the link plates for manually-controlling the turning movement of the rear axle by a lateral movement of the lever.

5. In a cotton gatherer of the character described, the progressively-movable vehicle, embodying an elongated reach bar, a pivoted rear axle, a pivoted front axle, wheels on said axles, gathering tines extended forwardly from the front axle, and a doubletree and swingletrees mounted upon the reach bar between the front and rear axles, and means for independently controlling the lateral turning movement of the axles.

6. In a cotton gatherer of the character described, the combination with a progressively-movable vehicle, embodying an elongated reach bar, a front axle pivoted on the reach bar, a rear axle, link plates pivotally mounted upon the rear axle, a lever pivotally mounted upon the rear axle and pivoted to the link plates, and traction wheels on the ends of the axles, of a plurality of gathering tines supported below and projected forward from the front axle, a seat on the reach bar between the axles, a rotatable upright shaft on the reach bar forward of the seat, a hand wheel thereon, a sprocket wheel on the shaft, a chain mounted upon the sprocket wheel, and connections extended forwardly from the chain and respectively attached at their forward ends on the front axle near the traction wheels.

7. In a cotton gatherer of the character described, a progressively-movable vehicle, embodying an elongated reach bar, a front axle pivoted on the forward end of the reach bar, a rear axle transversely pivoted on the rear portion of the reach bar, gathering tines on the front axle, means for manually controlling the lateral turning movement of the front axle, and independent means for manually controlling the lateral turning movement of the rear axle.

8. In a cotton gatherer, the combination with a wheeled vehicle, of a head bar suspended from the front axle of the vehicle, forwardly projecting tines secured to the head bar, a rock shaft having arms at its ends, links connecting the arms with the head bar, and a means for operating the rock shaft.

9. In a cotton gatherer, the combination with a wheeled vehicle, of a head bar suspended from the front axle of the vehicle, forwardly projecting tines secured to the head bar, carrier frames above the tines, each frame having diverging members, one of which is pivotally connected with the head bar and the other loosely connected with the front axle, a roller mounted in the frames, and means for swinging the head bar.

10. In a cotton gatherer, the combination with a wheeled vehicle, of a head bar, links having a loose engagement with each other for suspending the head bar from the front axle of the vehicle, two sets of forwardly projecting tines secured to the head bar, guide brackets secured to the front axle, carrier frames above the tines, each frame having diverging members, one of which is pivotally connected with the head bar and the other having a sliding engagement with the said brackets, a shaft mounted in the frames, two rollers on the shaft, a rock shaft on the front axle and having arms at its ends, links connecting the arms with the head bar, and means for operating the rock shaft.

In testimony whereof we have signed our names to this specification in the presence of two subscribing witnesses.

WILLIAM WARREN EDGE.
KNOTLEY FONZO CAMPBELL.

Witnesses:
  A. B. CORROTHERS,
  S. T. MILLER.